United States Patent [19]

Pritchatt

[11] Patent Number: 4,834,428

[45] Date of Patent: May 30, 1989

[54] PIPE CONNECTOR HAVING AN INTEGRAL SEALING MEMBER AND METHOD OF MAKING

[75] Inventor: Robert J. Pritchatt, Huddersfield, England

[73] Assignee: Naylor Bros. (Clayware) Limited, Barnsley, England

[21] Appl. No.: 876,683

[22] Filed: Jun. 20, 1986

[30] Foreign Application Priority Data

Jul. 1, 1985 [GB] United Kingdom ................. 8516613

[51] Int. Cl.$^4$ ............................................. F16L 9/12
[52] U.S. Cl. ................................. 285/345; 285/230; 285/369; 264/274; 156/245; 425/DIG. 47
[58] Field of Search ............. 285/110, 230, 231, 292, 285/295, 345, 369, 910, 923; 264/274, 278, 250, 268; 156/242, 245; 425/DIG. 47; 277/207 A

[56] References Cited

U.S. PATENT DOCUMENTS

| | | | |
|---|---|---|---|
| 3,106,040 | 10/1963 | Ostrander | 264/278 X |
| 3,189,947 | 6/1965 | Pettkoske | 264/278 X |
| 3,493,237 | 2/1970 | Kleindienst | 285/230 X |
| 3,879,067 | 4/1975 | Keyser | 285/230 X |
| 4,173,362 | 11/1979 | Glover et al. | 285/110 |
| 4,372,905 | 2/1983 | Bohman | 264/274 X |
| 4,436,276 | 3/1984 | Donahue | 264/278 X |
| 4,468,367 | 8/1984 | Beune et al. | 285/110 |
| 4,508,355 | 4/1985 | Ditcher | 277/207 A X |
| 4,566,704 | 1/1986 | Van Dorgeren | 285/110 |
| 4,598,915 | 7/1986 | Gilbert | 277/207 A |

FOREIGN PATENT DOCUMENTS

| | | | |
|---|---|---|---|
| 853082 | 10/1970 | Canada | 285/369 |
| 1236907 | 6/1971 | United Kingdom | 285/369 |
| 1312782 | 4/1973 | United Kingdom | 285/369 |
| 1477074 | 6/1977 | United Kingdom | 285/369 |

Primary Examiner—Randolph A. Reese
Assistant Examiner—Anthony Knight
Attorney, Agent, or Firm—William R. Hinds

[57] ABSTRACT

A pipe connector comprising a moulded thermoplastics sleeve and a captive annular sealing ring.

So that a root portion of the sealing ring is firmly bonded to the thermoplastics material of the sleeve, the materials are mutually compatible and the injection of the thermoplastics material during moulding has cleansed and/or scoured the root portion of the sealing ring.

14 Claims, 2 Drawing Sheets

PIPE CONNECTOR HAVING AN INTEGRAL SEALING MEMBER AND METHOD OF MAKING

FIELD OF THE INVENTION

The invention relates to a sleeve-type pipe coupling, in particular for connecting together clayware sewer pipes and fittings.

When connecting clayware sewer pipes end to end it is important that they are connected in a watertight manner. Consequently, it is common practice to employ a flexible mechanical sleeve joint, the sleeve of which has respective inserted annular resilient seals at its opposite ends which are adapted to embrace the ends of the clayware pipes and form a watertight flexible mechanical joint thereon. The respective annular resilient seals may be located in undercut grooves in the sleeve, the undercut grooves being formed by snap-on annular end caps connected to the sleeve. However, due to the fact that an end of a pipe may have sharp edges, especially if it has had to be cut to length on site, it is a problem that the inserted annular seals sometimes become forced out of their seatings when such a pipe is being entered into the sleeve with the result that the pipe line is caused to leak. This can prevent the joint assembly concerned from passing the necessary acceptance tests for meeting the requisite codes of practice.

The object of the invention is to provide a pipe connector which will not be prone to this drawback.

SUMMARY OF THE INVENTION

According to one aspect of the invention, there is provided a method of making a pipe connector, the method comprising the steps of forming an annular sealing ring of a crosslinked (vulcanised) elastomeric material, and subsequently placing the pre-formed sealing ring in an injection mould and moulding a thermoplastics sleeve element so that a radially inner pipe contacting portion of the pre-formed sealing ring is located radially within the sleeve element and a root portion of said pre-formed sealing ring is embedded within the thermoplastics material of the sleeve element, the crosslinked elastomeric material of which the pre-formed sealing ring is made being one which is compatible with the particular thermoplastics material of the sleeve and the pre-formed sealing ring being positioned in the injection mould in such a position that, upon injection of the molten thermoplastics material into the mould the molten material cleanses and/or scours an exposed surface area of the root portion of the pre-formed sealing ring such that said root portion is securely bonded to the material of the sleeve with a chemical or physical bond. The method may include the step of forming the sealing ring with a relatively thicker portion along its radially outer marginal edge.

According to another aspect of the invention, there is provided a pipe connector comprising a moulded thermoplastics sleeve element having, at least at one end, a portion within which has been moulded a root portion of a captive annular sealing ring made of a crosslinked elastomeric material, said root portion being connected to a pipe contacting portion of the ring, the arrangement being such that the root portion of the sealing ring is firmly bonded to the thermoplastics material of the sleeve whereas the pipe contacting portion of the ring is not bonded to the thermoplastics material of the sleeve but merely lies against the inside surface of the sleeve. The crosslinked elastomeric material of which the pre-formed sealing ring is made may have a monomer in common with the thermoplastics material, or the two may have monomers which are chemical homologues which will produce compatibility of the materials, that is to say will ensure that the thermoplastics material and the elastomeric material of the sealing ring have the potential for bonding. The thermoplastics component may be a homo-polymer, a co-polymer or a blend and may be filled or unfilled. The elastomer component will have been pre-formed from normal commercial formulations and moulded by conventional processing methods.

Preferably the pipe contacting portion of the ring will be constituted in cross section by a radially inner finger portion and an axially spaced locating portion engaging a similarly shaped groove formed in the bore of the sleeve, the arrangement being such that as a pipe is entered into the connector, it acts against the pipe contacting portion of the sealing ring to deform it so that the ring material between the radially outer surface of the pipe and the bore of the sleeve is compressed and produces a watertight seal, the engagement of the locating portion of the sealing ring with the groove formed within the bore of the sleeve causing a compression of the ring material in the region of the groove in the bore of the sleeve rather than excessive stretching of the flexible root portion. The locating portion of the sealing ring will preferably bear against the groove formed within the bore of the sleeve at an angle to a plane perpendicular to the axis of the sleeve, the arrangement being such that the re-engagement of said locating portion with said groove after it has been temporarily detached therefrom (as will have been the case when the sleeve has been removed from the mould in which it has been made) can take place quite easily.

Throughout this specification the term "Pre-formed sealing ring" is intended to mean a sealing ring which has been formed prior to the moulding of the thermoplastics sleeve element in apparatus other than that in which said sleeve element is formed. Consequently, the pre-formed sealing ring may well be (but need not necessarily be) a "bought out finished" component. The meaning of the phrase "forming an annular sealing ring of a crosslinked (vulcanised) elastomeric material" is therefore to be construed accordingly.

DESCRIPTION OF THE PREFERRED EMBODIMENT.

Figure 2:
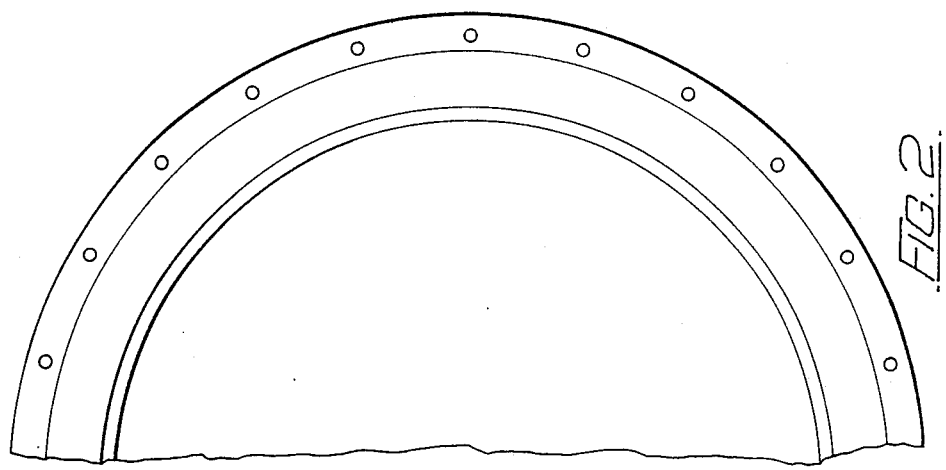
FIG. 2 is an end view thereof.
Figure 1:
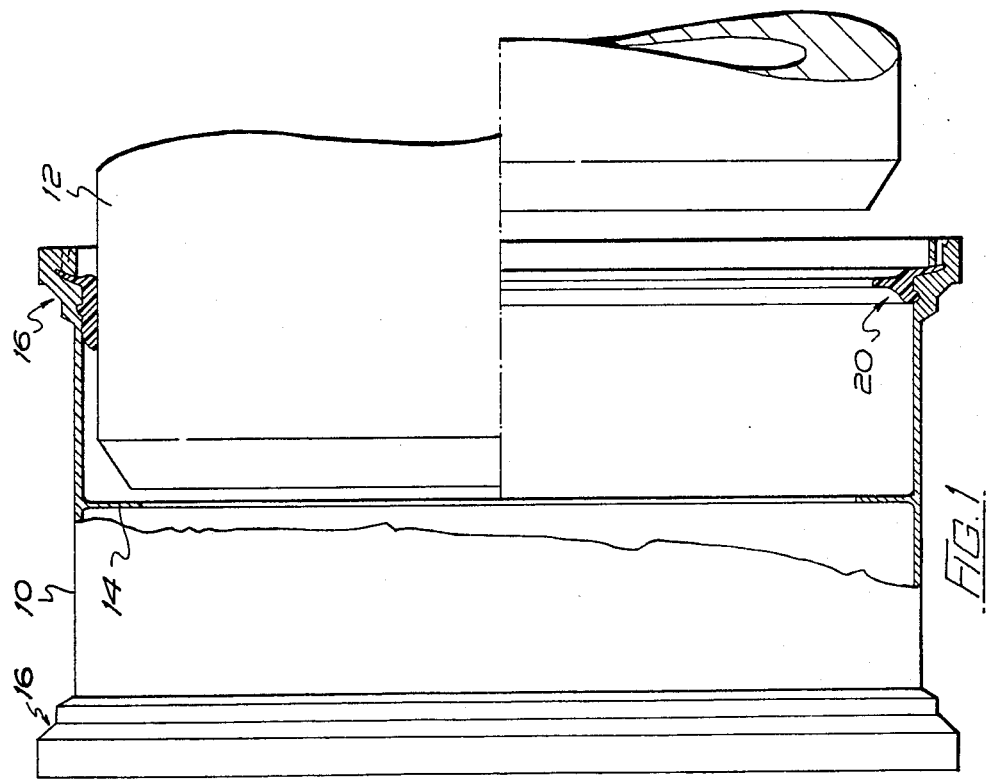
FIG. 1 is a part sectional side view of a pipe connector embodying the invention.
Figure 3:
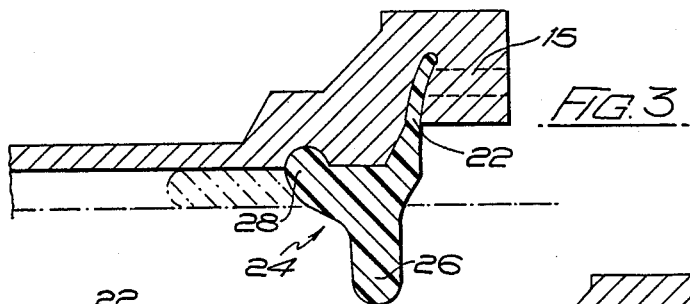
FIG. 3 is a detail view drawn to a somewhat larger scale than FIGS. 1 and 2.

Referring now to FIGS. 1 to 3 of the drawings, the pipe connector there illustrated comprises a double-ended sleeve element 10 moulded of polypropylene or polyethylene, each end of the sleeve element being adapted to receive the end of a clayware pipe 12 as shown in the right hand half of FIG. 1. An abutment 14 is shown to be provided within the sleeve element to limit the extent by which a clayware pipe can be entered into the connector from either end.

Each end of the moulded plastics sleeve has a portion 16 of enlarged wall thickness within which has been moulded a relatively narrow and flexible portion 22 of a pre-formed captive annular sealing ring 20 made of crosslinked ethylene propylene rubber. (It will be understood that the annular sealing ring is located in position in the mould in which the plastics sleeve is to be formed and that when the moulding material is then injected into the mould it flows around the relatively narrow and flexible portion of the ring to make it captive. The dotted lines 15 in FIG. 3 and the series of holes around the periphery of the sleeve in FIG. 2 indicate the manner in which the sealing ring has initially been located in position in the mould by a series of pins or the like). Because the moulding material is polypropylene or polyethylene and the pre-formed crosslinked elastomeric sealing ring is made of ethylene propylene rubber, the moulding material flow during the sleeve moulding operation has been such that the relatively narrow and flexible portion of the ring has become securely bonded to the material of the sleeve. The bonding comes about because of the fact that the molten polymer material injected into the mould flows across and cleanses and/or scours the surface of the root portion of the pre-formed sealing ring.

The pre-formed sealing ring 20 has a pipe contacting portion generally indicated 24, the latter in its free condition, as drawn in FIG. 3, being constituted in cross section by a radially inner finger portion 26 and an axially spaced locating portion 28 of part-circular shape in cross section which engages a similar shaped groove formed within the bore of the sleeve.

The arrangement is such that, as shown in FIG. 3, when a clayware pipe is entered into the connector, it acts against the pipe contacting portion of the sealing ring to deform it, as shown in phantom lines, so that the ring material between the radially outer surface of the pipe and the bore of the sleeve is compressed to produce a good watertight seal. However, by virtue of the fact that the locating portion 28 engages the groove formed within the bore of the sleeve, the considerable axial displacement of the material of the ring as the pipe enters the sleeve results in a compression of the ring in the region of the groove within the sleeve rather than in excessive stretching of the relatively narrow and flexible portion 22 as would be the case if the bore of the sleeve was completely plain.

Figure 4:
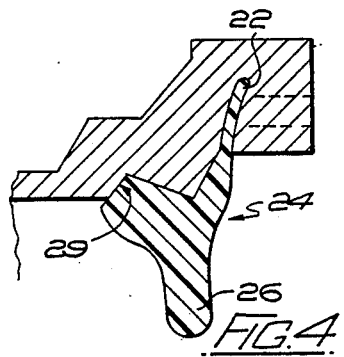
FIG. 4 is a view similar to FIG. 3 and illustrating a possible modification.
Figure 5:
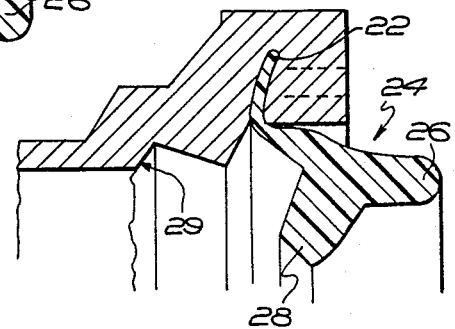
FIG. 5 is a view of the pipe connector arrangement of FIG. 4 with an operative part of the sealing ring displaced from its normal position.

There are times when the locating portion of the sealing ring will be temporarily detached from the groove in the bore of the sleeve (as for example when the sleeve is being removed from the mould in which it has been made or when a clayware pipe is removed from the sleeve). It has been found that a locating portion of the cross sectional shape shown in FIG. 3 can sometimes be difficult to re-engage with its groove, especially if the bore of the sleeve, at the edge of the groove, has connected fragements of moulding "flash" tending to obstruct the entry of the locating portion into said groove. For this reason, the cross sectional shape of the sealing ring illustrated in FIG. 4 is shown to have been modified; instead of being of half-round shape in cross section it is shown to be of triangular shape. In other words, the locating portion of the sealing ring bears against the groove formed within the bore of the sleeve at an angle to a plane perpendicular to the axis of the sleeve, that is to say against the surface 29. When the operative part of the sealing ring has been temporarily displaced relative to the sleeve, as shown in FIG. 5, it can subsequently be returned without difficulty to the operative position in which it is shown in FIG. 4. It will be understood that even if moulding "flash" is present in the bore of the sleeve at the edge of the groove, this will be inclined at an angle as shown in FIG. 5 and will not interfere with the proper re-seating of the sealing ring in its operative position.

Figure 6:
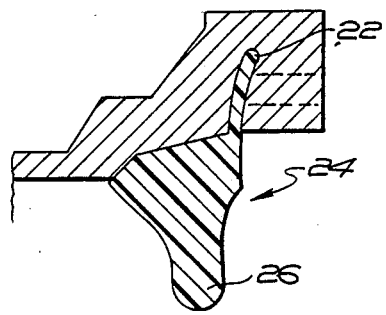
FIGS. 6 to 9 are views similar to FIG. 4 which illustrate other possible variations of sealing ring configuration.
Figure 7:
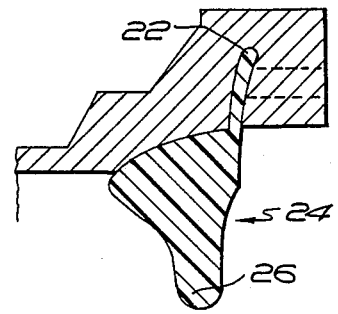

Referring now to FIG. 6, this illustrates a slight variation of sealing ring configuration from that illustrated in FIG. 4. However, it will be understood that the arrangement functions in exactly the same way as the arrangement of FIG. 4. A further slight variation of this is illustrated in FIG. 7 where, instead of having differently angled frusto-conical surfaces meeting along a circumferential line, the two surfaces of the pipe contacting portion of the ring which engage the inner surface of the sleeve merge gradually on a radius.

Figure 8:
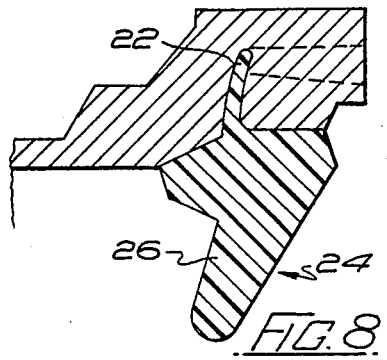

In FIG. 8 there is illustrated a still further variation in which the relatively narrow and flexible portion 18 is connected to the pipe contacting portion 24 at a point substantially midway of the width of the latter. A slight variation of this is illustrated in FIG. 9 where it will be seen that the cross sectional shape of the sealing ring is symetrical about a plane bisecting its thickness, whereby it can be inserted either way round in the mould in which the connector is to be formed.

Figure 9:
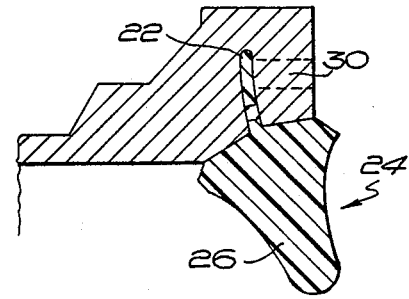

It will be seen in FIG. 9 that a further feature of the arrangement there illustrated is the presence of a series of small holes 30 extending through the relatively narrow and flexible portion 22. Moulding material has been able to run through these holes during the moulding of the sleeve. (The moulding material flowing through the holes 30 in effect ties together the parts of the sleeve on the opposite sides of the portion 18 of the ring and forms a physical barrier against the release of the portion 22 of the ring through the narrow gap if the bonding of the said portion to the material of the sleeve should ever prove to be less than wholly effective in retaining the pre-formed sealing ring within the sleeve). The feature just described and illustrated only in FIG. 9 is a feature which could of course be incorporated in any one of the other illustrated embodiments. Instead of or in addition to this, the relatively narrow and flexible portion of the pre-formed ring could be formed with a relatively thicker root portion along its radially outer marginal edge to lessen still further any chance that the ring might ever be forced out of the sleeve.

What I claim and desire to secure by Letters Patent is:

1. A method of making a pipe connector, the method comprising the steps of forming an annular sealing ring of crosslinked vulcanized elastomeric material, and subsequently locating the pre-formed sealing ring in position in an injection mould by a series of pin-like members and moulding a thermoplastics sleeve element so that a radially inner pipe contacting portion of the pre-formed sealing ring is located radially within the sleeve element and a root portion of said pre-formed sealing ring is embedded on all exterior surfaces within the thermoplastic material of the sleeve element, the crosslinked elastomeric material of which the pre-formed sealing ring is made being one which is compatible with the particular thermoplastics material of the sleeve and the pre-formed sealing ring being positioned in the injection mould in such a position that, upon injection of the molten thermoplastic material into the mould the molten material effects a cleansing/scouring action on an exposed surface area of the root portion of the pre-formed sealing ring such that only said root portion is securely bonded to the material of the sleeve.

2. The method claimed in claim 2, including the step of forming the sealing ring with a relatively thicker portion along its radially outer marginal edge.

3. A pipe connector comprising a moulded thermoplastics sleeve element having, at least at one end, a portion within which has been moulded and embedded a root portion of a captive annular sealing ring made of a cross-linked elastomeric material, said root portion being connected to a pipe contacting portion of the ring, the arrangement being such that the root portion of the sealing ring is firmly embedded in and bonded to the thermoplastics material of the sleeve during the moulding of the sleeve whereas the pipe contacting portion of the ring is not bonded to the thermoplastics material of the sleeve but merely lies against the inside surface of the sleeve.

4. A pipe connector as claimed in claim 3, in which the crosslinked elastomeric material of which the pre-formed sealing ring is made has a monomer in common with the thermoplastics material to ensure that the thermoplastics material and the elastomeric material of the sealing ring have the potential for bonding.

5. A pipe connector as claimed in claim 3, in which the crosslinked elastomeric material of which the pre-formed sealing ring is made, and the thermoplastics material, have monomers which are chemical homologues which will produce compatibility of the materials to ensure that the thermoplastics material and the elastomeric material of the sealing ring have the potential for bonding.

6. A pipe connector as claimed in claim 3, in which the thermoplastics component is a homo-polymer.

7. A pipe connector as claimed in claim 3, in which the thermoplastics component is a co-polymer.

8. A pipe connector as claimed in claim 3, in which the thermoplastics component is a blend of homo-polymer and co-polymer materials.

9. A pipe connector as claimed in claim 3, in which the pipe contacting portion of the ring is constituted in cross section by a radially inner finger portion and an axially spaced locating portion engaging a similarly shaped groove formed in the bore of the sleeve, the arrangement being such that as a pipe is entered into the connector, it acts against the pipe contacting portion of the sealing ring to deform it so that the ring material between the radially outer surface of the pipe and the bore of the sleeve is compressed and produces a water-tight seal, the engagement of the locating portion of the sealing ring with the groove formed within the bore of the sleeve causing a compression of the ring material in the region of the groove in the bore of the sleeve rather than excessive stretching of the flexible root portion.

10. A pipe connector as claimed in claim 9, in which the locating portion of the sealing ring bears against the groove formed within the bore of the sleeve, at an angle to a plane perpendicular to the axis of the sleeve, the arrangement being such that the re-engagement of said locating portion with said groove after it has been temporarily detached therefrom can take place quite easily.

11. A pipe connector as claimed in claim 3 in which the root portion of the sealing ring contains at least one small hole through which the thermoplastic material flowed during molding of the sleeve thus assisting in retaining said ring in position.

12. The method claimed in claim 1, including the step of forming the sealing ring with at least one small hole through the root portion.

13. The method claimed in claim 1, wherein the molten thermoplastic material is polypropylene.

14. The method claimed in claim 13, wherein the elastomeric sealing ring is produced from ethylene propylene rubber.

* * * * *